UNITED STATES PATENT OFFICE.

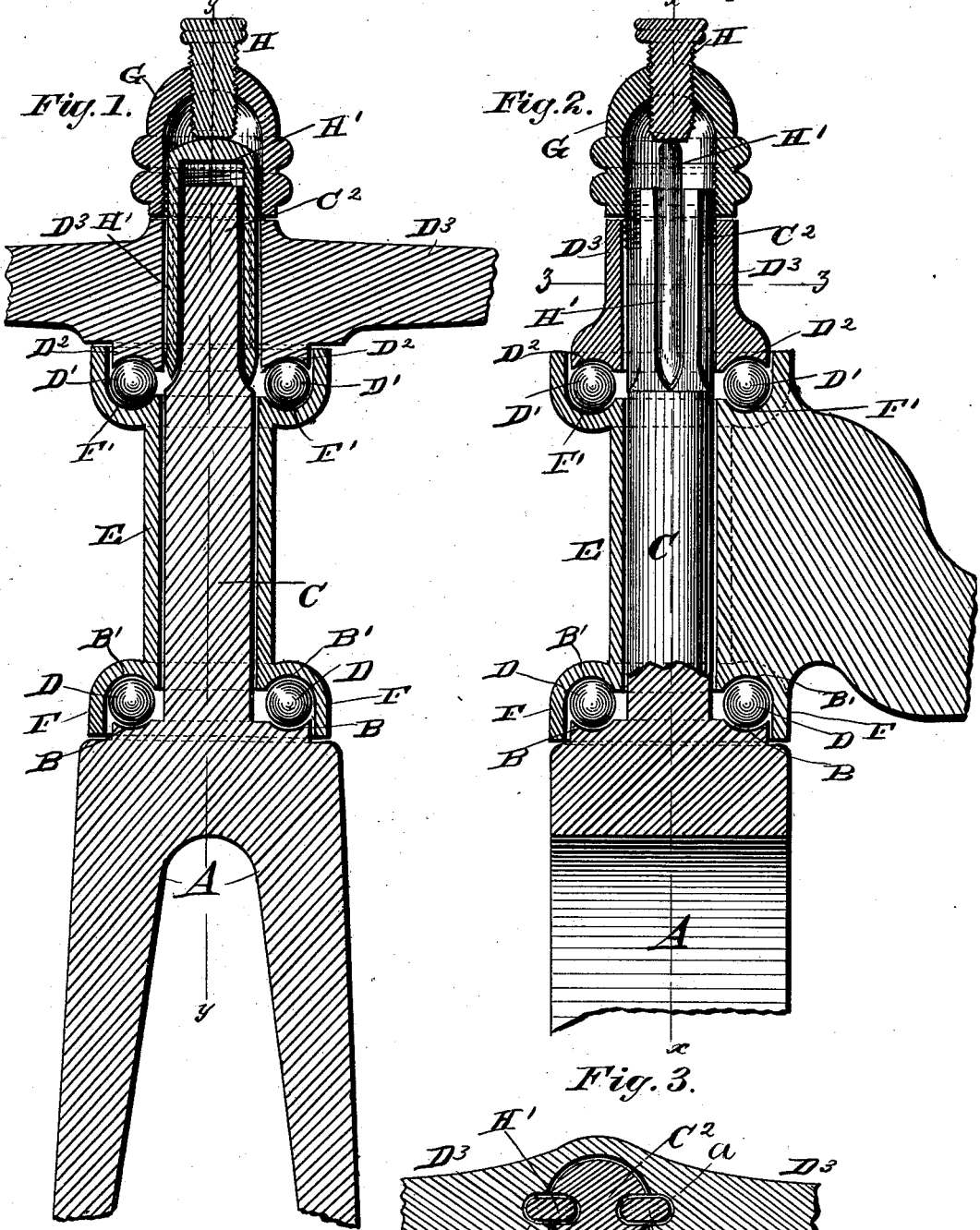

GEORGE A. PARKER, OF CHICOPEE, MASSACHUSETTS, ASSIGNOR TO THE POPE MANUFACTURING COMPANY, OF PORTLAND, MAINE.

BALL-BEARING FOR BICYCLES.

SPECIFICATION forming part of Letters Patent No. 361,233, dated April 12, 1887.

Application filed March 5, 1886. Renewed February 28, 1887. Serial No. 229,199. (No model.)

*To all whom it may concern:*

Be it known that I, GEORGE A. PARKER, a citizen of the United States, residing at Chicopee, in the county of Hampden and State of Massachusetts, have invented certain new and useful Improvements in Ball-Bearings for Fork-Head, Backbone, and Handle-Bars of Bicycles; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a vertical longitudinal section on the line $x\ x$, Fig. 2. Fig. 2 is a similar section on the line $y\ y$, Fig. 1. Fig. 3 is a horizontal section on the line $z\ z$, Fig. 2.

My invention relates to improvements in the bearings for fork-heads, backbones and handle-bars of bicycles; and it consists in the construction and novel combination of parts, as hereinafter set forth, and pointed out in the claims.

Referring by letter to the accompanying drawings, A designates the fork for the large wheel, which fork is provided with a groove or ball-seat, B, which surrounds the post C at its lower end, and is concave in cross-section to receive the lower halves of the balls D, which fill the groove B loosely and surround the post.

E is a sleeve which encircles the post C, and has an outwardly and downwardly flaring integral flange, F, at its lower end, which is provided with a groove, B', in its lower face, which groove B' receives the upper halves of the balls D, to form the lower friction-seat for the sleeve E. The upper end of the sleeve E, which surrounds the upper end of the larger lower part, C, of the post, is provided with a groove or ball-seat, F', in which an encircling row of friction-balls, D', are loosely seated, and on which balls D' the bearing $D^2$ of the handle-bar $D^3$ rests. This bearing $D^2$ may be integral with the handle-bar, or it may consist of a steel washer grooved on its under face to fit the balls D'.

The top portion or smaller portion, $C^2$, of the post is threaded externally to receive an adjusting-nut, G, which is drilled out and tapped to receive the set-screw H, which acts upon a staple-shaped spring, H', and causes it to hold the handle-bar $D^3$, and at the same time acts as a check-nut upon the adjusting-nut G at the upper end of the fork-post.

The upper portion of the post C is made circular in cross-section, and is provided at diametrical opposite points with vertical grooves $a$, which incline outwardly and downwardly at their base. The branches of the spring-staple H, which are also beveled at their lower ends, as shown, are designed to occupy the grooves of the post and, when pressed upon by the screw H, to enter the grooves $b$ in the vertical aperture of the handle-bar. Thus it will be seen that the staple in its natural position would be held in from engagement with the grooves of the handle-bar; but when the screw H is brought down upon the upper end of this staple its branches will be forced outwardly and will occupy the said grooves of the handle-bar, thereby detachably uniting the parts in such a manner that when the handle-bar has been turned the forked post must also turn. It will also be seen that by this construction the wear at such points, which is caused by friction, may be taken up by means of the set-screw H. The lower portions of the staple-branches are thickened, so that when forced out into the grooves of the handle-bar they may not altogether leave the grooves in the post. This construction renders the handle-bar an adjustable one, and at the same time is simple in form.

The sleeve E is made integral with the backbone of the bicycle, and is very easily made in this way. In this construction the fork-head can be made very solid, as the adjusting-nut may be screwed tight, and still the big wheel may be turned to the right or left with ease, while in the older constructions with a dead-center, if the adjusting-screw be turned up tightly, the big wheel cannot be turned to the right or the left, and if the adjusting-screw be left loose it will rattle.

The fork-post C may be made separate from the elbow of the fork, which makes it easier to repair, if it becomes sprung in any way. In this latter construction, the elbow must be drilled and the lower end of the fork-post made with a shoulder and fitted to the elbow of the fork. This makes it easy to repair, as any mechanic is able to do it, thereby saving the expense of shipping the machine to the manufactory.

Having described this invention, what I claim, and desire to secure by Letters Patent, is—

1. The combination, with the fork-post having the ball-groove around the lower end of the post, of the backbone with the integral sleeve with grooved upper and lower ends, the friction-balls in said grooves, the handle-bar with a groove at its lower side around the fork-post, the spring-staple in the handle-bar, the adjusting-nut at the upper end of the fork-post, and the set-screw in the upper end of the adjusting-nut, substantially as specified.

2. The combination, with the fork-post having the lower larger and smaller upper diameters and the grooved sleeve and friction-balls, of the handle-bar, spring-staple, and the adjusting-nut with set-screw, substantially as specified.

3. The combination, with the fork-post and the backbone having the sleeve with flaring grooved ends and the friction-balls in said grooves, of the handle-bar, spring-staple, adjusting-nut, and the set-screw in said adjusting-nut, substantially as specified.

4. In a bicycle, the combination, with the post having the vertical grooves, of the handle-bar, also having grooves, and a staple adapted to enter the respective grooves to unite the parts, substantially as specified.

5. The combination, with the fork-post having the vertical grooves and the threaded upper end, of the handle-bar having its vertical aperture provided with grooves, the tapped nut screwed on the upper end of the post, the set-screw, and spring-staple, substantially as specified.

In testimony whereof I affix my signature in presence of two witnesses.

GEO. A. PARKER.

Witnesses:
LORANUS E. HITCHCOCK,
DAVID HALE.